United States Patent [19]

Brandenstein et al.

[11] Patent Number: 4,526,259

[45] Date of Patent: Jul. 2, 1985

[54] HYDRAULICALLY OPERABLE RELEASE ARRANGEMENT

[75] Inventors: Manfred Brandenstein, Eussenheim; Lothar Walter, Schweinfurt; Heinz Kiener, Waigolshausen, all of Fed. Rep. of Germany

[73] Assignee: SKF Kugellagerfabriken GmbH, Schweinfurt, Fed. Rep. of Germany

[21] Appl. No.: 429,293

[22] Filed: Sep. 30, 1982

[30] Foreign Application Priority Data

Nov. 14, 1981 [DE] Fed. Rep. of Germany ....... 3145363

[51] Int. Cl.³ .................... F16D 23/14; F16D 25/08
[52] U.S. Cl. ................ 192/91 A; 92/130 R; 192/98
[58] Field of Search ............... 192/85 CA, 91 A, 98, 192/110 B; 92/130 R, 165 PR

[56] References Cited

U.S. PATENT DOCUMENTS 3,188,048 6/1965 Sutherland ................ 92/130 R
4,328,883 5/1982 Shellhause ................ 92/165 PR

FOREIGN PATENT DOCUMENTS 2521364 11/1976 Fed. Rep. of Germany ... 92/165 PR

Primary Examiner—Rodney H. Bonck
Attorney, Agent, or Firm—Yuter, Rosen & Dainow

[57] ABSTRACT

In a hydraulically operable release arrangement for clutches, especially for vehicle clutches, the release force is transmitted to the plate spring or the like of the clutch by way of a piston, a fixed bearing ring, a multiplicity of rolling bodies, and a rotating bearing ring. The piston is movably arranged in a housing and is biased by a helical spring arranged in a pressure space formed between the piston and the housing. The piston and the housing are each provided with an axial projection. In order to secure the piston against rotation and to damp vibrations in the piston without additional machining or special parts, the helical spring is arranged with its spring ends abutting the axial projections such that rotation of the piston in the direction of rotation of the rotating bearing ring is prevented.

7 Claims, 2 Drawing Figures

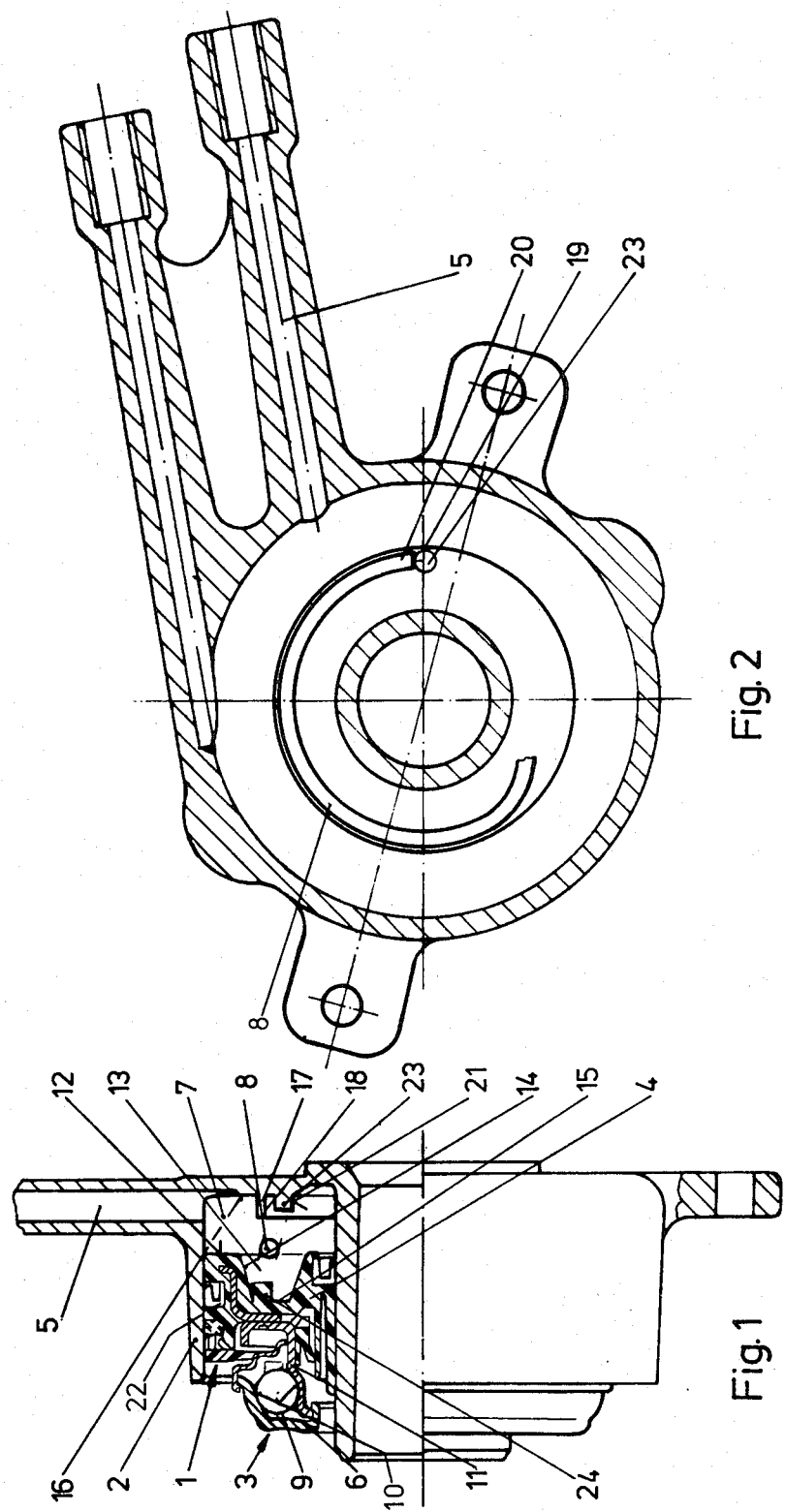

HYDRAULICALLY OPERABLE RELEASE ARRANGEMENT

This invention relates an hydraulically operable release arrangement for clutches, especially for vehicle clutches, in which the release force is transmitted to the plate spring of the clutch by way of a piston biased by a helical spring, the fixed bearing ring, the rolling bodies and the rotating bearing ring.

The securement of a piston of an hydraulic arrangement against turning, for example by a key connection to a shaft or the like, already belongs to the state of the art. This type of connection is however proportionally expensive, since the piston as well as the shaft must be machined and the key inserted.

The invention is based upon the problem of providing an easy to assemble and inexpensively producable hydraulic operating release arrangement for clutches, especially for vehicle clutches, in which securement against rotation of the piston engaging the helical spring is achieved without additional machining and without special parts, and in which the rotational vibration of the piston is damped.

This problem is solved in accordance with the invention in a hydraulically released arrangement for clutches of the above-described type, in that a helical spring arranged between the piston and the housing and the pressure space has facing surfaces of the spring ends which engage the projections of the piston and the housing, respectively, whereby the facing surfaces of the spring ends are arranged behind the projection of the piston in the turning direction of the rotating bearing ring and in front of the projection on the housing in the turning direction of the rotating bearing ring.

According to a further feature of the invention the spring ends engage the outer surface of the axially directed projections, which are arranged respectively on the base surface on the facing side of a recess arranged on the piston and on the bottom surface of the housing.

Further features of the invention are more clearly explained in the following description of an embodiment.

The description is presented with reference to the following drawings:

FIG. 1 is a sectional view of an hydraulically operating release arrangement for clutches with the rotation securement for the piston according to the invention, FIG. 2 a side view of the housing shown in FIG. 1 with the helical spring shown by way of example.

FIGS. 1 and 2 illustrate an hydraulically operable release arrangement for clutches, in which a piston 4 connected to a clutch release bearing 3 is arranged in a ring space 1 of a housing 2, the piston being pushed to the left upon the release of the clutch by pressure medium feeding into the opening 5. In this arrangement the clutch bearing 3 engages the clutch plate spring (not shown) with the outer ring 6. A helical spring 8 is arranged in the pressure space 7 between the piston 4 and the housing 2, by means of which the clutch thrust bearing 3, in the form of an angular contact ball bearing, is biased, so that rolling bodies 9 are constantly held in contact with the races 10 of the outer ring 6 and inner ring 11. The piston 4 has an annular recess with a bevelled side wall 14 and a radially extending base surface 15 extending outwardly from the facing side 12 directed toward the pressure space 7, for installing and centering the helical spring 8. By means of the bevel-shaped side walls 14 it is achieved that the helical spring 8 is centered in the recess 13 in the assembly on the base surface 15. The centering of the helical spring 8 on the bottom surface 16 of the housing 2 results by the use of an axially extending annular projection 17, into whose bore 18 the helical spring 8 extends. The securement of the piston 4 against turning results by means of the helical spring 8, the facing surfaces 19 of the spring end 20 of which engage the outer surfaces 21, 22 of axially directed projections 23, 24, the projections 23, 24 being arranged on the base surface 15 of the recess 13 and the bottom surface 16 of the housing 2, respectively.

In the assembly of the hydraulically operating clutch release first the helical spring 8 is inserted in the bore 18 of the annular projection 17 and rotated in the turning direction of the outer ring 6, until the facing surface 19 of the end 20 of the helical spring 8 engages the projection 23. Then the piston 4 is placed in an inverted position on the helical spring 8 and likewise turned in the turning direction of the outer ring 6, until the other end of the helical spring 8 engages the projection 24. By this feature not only is the piston 4 secured against turning in the turning direction of the outer ring 6, but also a resilient damping of the turning vibration results, which vibration occurs upon release of the clutch.

This described embodiment represents only one example of a hydraulically operable clutch release according to the invention. Changes in the construction of the individual components are possible within the scope of the invention without further description.

What is claimed is:

1. In an hydraulically operable clutch release wherein a piston is moveable in a cylinder to transmit movement thereon to a clutch release bearing, the cylinder being formed in a housing which defines a chamber on one side of the piston for receiving an hydraulic fluid; the improvement comprising a helical spring extending between said housing and piston for resiliently biasing said piston toward said clutch release bearing, means for radially holding said spring with respect to said piston and housing, said spring having end faces, and projections extending axially from said housing and piston to circumferentially engage the respective said end faces of said spring, whereby rotation of said piston with respect to said housing is inhibited.

2. The device of claim 1 wherein said means holding said spring radially comprises recesses on said piston and housing, said projections extending axially from said recesses.

3. The device of claim 1 wherein said piston is annular.

4. An hydraulically operable release arrangement for clutches, in which the release force is transmitted to a plate spring or the like of a clutch by way of a piston, a fixed bearing ring, a multiplicity of rolling bodies, and a rotating bearing ring, wherein said piston is movably arranged in a housing and is biased by a helical spring arranged in a pressure space formed between said piston and said housing, said piston and said housing are each provided with an axially directed projection, and said helical spring has first and second spring ends each having a facing surface, the facing surface of said first spring end being arranged to abut said axial projection on said piston and the facing surface of said second spring end being arranged to abut said axial projection on said housing such that rotation of said piston in the direction of rotation of said rotating bearing ring is prevented.

5. An hydraulically operable release arrangement as defined in claim 4 wherein said axial projections are respectively arranged on a base surface of a recess formed in said piston and on a bottom surface of said housing.

6. An hydraulically operable release arrangement as defined in claim 4 wherein said piston has an annular recess on the side facing said pressure space, said annular recess having a beveled outer side wall arranged such that the smallest diameter of said annular recess is slightly greater than the largest diameter of said helical spring, for receiving said largest diameter end of said spring.

7. An hydraulically operable release arrangement according to claim 4 wherein said housing has a bottom surface on which an axially directed annular projection is arranged and said helical spring is formed to extend into the bore defined by said annular projection.

* * * * *